Patented Feb. 11, 1941

2,231,360

UNITED STATES PATENT OFFICE 2,231,360

CHLOROPROPIONITRILES AND METHOD OF PREPARING THEM

James D'Ianni, Akron, Ohio, assignor to Wingfoot Corporation, Wilmington, Del., a corporation of Delaware No Drawing. Application March 15, 1940,
Serial No. 324,145

8 Claims. (Cl. 260—464)

This invention relates to certain chlorine-containing compounds and to a method of preparing the same. More particularly, it relates to the preparation of alpha, beta-dichloropropionitrile and alpha-chloro, beta-hydroxypropionitrile.

In previous attempts to prepare dichloropropionitrile by the direct chlorination of acrylonitrile, a non-aqueous medium was employed and it was found that the dichloro compound was not formed, the chlorination yielding, instead, alpha, alpha, beta-trichloropropionitrile and beta-chloropropionitrile. It has now been found that, if this chlorination be conducted in an aqueous medium, alpha, beta-dichloropropionitrile is formed in good yield and accompanied by a substantial quantity of the related compound alpha-chloro, beta-hydroxypropionitrile.

The reactions involved are the following:

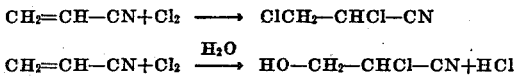

As will be observed, in one instance an atom of chlorine is added to each of the alpha and beta carbon atoms of the acrylonitrile, while in the other instance, a chlorine atom is added to the alpha carbon atom but a hydroxyl group appears on the beta carbon atom, hydrochloric acid being generated.

The reaction is conducted very simply by adding the acrylonitrile to a quantity of water or to a medium which is largely aqueous in nature and then passing chlorine into the suspension or emulsion of acrylonitrile in water until no more chlorine is absorbed or until the theoretical amount has been added. The temperature is maintained in the neighborhood of 20–30° C., or approximately room temperature. Of course, this range may be departed from somewhat, a range from 25 to 50° C. being useful, but, ordinarily, best results will be obtained within the range first given. A chlorine carrier or catalyst may be present, such as copper chloride, or other metal chloride, although the reaction can be conducted with the absence of a catalyst. An emulsifying agent, such as Aquarex D, may be employed, if desired. The function of the emulsifying agent is to promote finer division of the acrylonitrile and, hence, may be omitted if intimate contact of gas and liquid is otherwise maintained, as by agitation. Upon completion of the chlorination, the liquid is fractionated to yield two fractions consisting respectively of alpha, beta-dichloropropionitrile and of alpha-chloro, beta-hydroxypropionitrile.

The process is illustrated by the following example to which, however, the practice of the invention is not limited. Fifty-three grams of vinyl cyanide is stirred with 400 cc. of water containing 0.4 gram of copper chloride and chlorine gas is passed in, while continuing agitation, for a period of about 24 hours. The suspension or emulsion is maintained at a temperature of 20–30° C. during this time and a gain in weight of 26 grams was noted. The reaction mixture was then subjected to continuous ether extraction and the extract fractionated to obtain the two products. A 26% yield of alpha, beta, dichloropropionitrile, 32 grams, was obtained having a boiling point of 80° C./25 mm., refractive index $$N_D^{26} 1.4638,$$

density $$D_{25}^{25} 1.303.$$

The analysis corresponded with the theory for alpha, beta, dichloropropionitrile. A 20% yield of alpha-chloro, beta-hydroxypropionitrile, 21 grams, was likewise obtained, having a boiling point of 115–120° C./25 mm., refractive index $$N_D^{26} 1.4600$$

and density $$D_{25}^{25} 1.303.$$

The analysis corresponded with the theory for alphachloro, beta-hydroxypropionitrile.

The effect of an emulsifying agent on the course of the reaction was investigated and it was found that, apparently, the presence of such an agent favors the formation of the alpha chloro, beta-hydroxypropionitrile, while its absence favors, somewhat, the formation of the dichloropropionitrile. Thus, 1 mol (53 grams) of acrylonitrile was suspended in 150 c. c. of water and chlorinated, with stirring, for six hours. In the first hour the temperature rose from 26° C. to a maximum of 50° C. and then gradually fell to 32° C. by the end of the reaction. The net gain in weight was 58 grams. When the same run was conducted in the presence of 3.8 grams of Aquarex D, the temperature rose from 26° to 48° C. in the course of an hour and fell to 32° C. at the end of six hours. The net gain in weight was 54 grams. The layers were separated, in each case, and the water layer was extracted four times with a total of 400 c. c. of ether. Fractionation of the products gave:

|   | | With aquarex D | No emulsifier |
|---|---|---|---|
| 1 | B. P. 80-85°/35 mm | 46 g. 37% | 63 g. 51% |
| 2 | B. P. 90-95°/3 mm | 9 g. 9% | 7 g. 7% |
| 3 | B. P. 130-150°/3 mm | 15 | 17 |
|   |   | 70 | 87 |

The lower yield, when Aquarex D was present, indicates the formation of more chloro hydroxypropionitrile, which is water-soluble, and is, therefore, retained in the water layer which was not completely extracted.

The above-described method has been given herein as the most efficient at present known for the preparation of these compounds; however, the compounds themselves have not heretofore been described, so far as known, and hence are claimed as new compositions of matter, regardless of the method of preparation which may be employed.

While there have been described above certain preferred embodiments of the invention, it will be apparent that various changes and modifications may be made therein without departing from the spirit of such invention. Accordingly, the invention is to be limited only by the appended claims in which it is intended to set forth all features of patentable novelty residing therein.

I claim:

1. A method of preparing alpha, beta-dichloropropionitrile and alpha-chloro, beta-hydroxypropionitrile which comprises placing acrylonitrile in an aqueous medium, passing in chlorine gas and then fractionating to obtain a fraction containing the alpha, beta-dichloropropionitrile and another fraction containing the alpha-chloro, beta-hydroxypropionitrile.

2. A method of preparing alpha, beta-dichloropropionitrile and alpha-chloro, beta-hydroxypropionitrile which comprises placing acrylonitrile in an aqueous medium containing a metal chloride, passing in chlorine gas and then fractionating to obtain a fraction containing the alpha, beta-dichloropropionitrile and another fraction containing the alpha-chloro, beta-hydroxypropionitrile.

3. A method of preparing alpha, beta-dichloropropionitrile and alpha-chloro, beta-hydroxypropionitrile which comprises placing acrylonitrile in an aqueous medium containing a metal chloride and an emulsifying agent, passing in chlorine gas and then fractionating to obtain a fraction containing the alpha, beta-dichloropropionitrile and another fraction containing the alpha-chloro, beta-hydroxypropionitrile.

4. A method of preparing alpha, beta-dichloropropionitrile and alpha-chloro, beta-hydroxypropionitrile which comprises placing acrylonitrile in an aqueous medium containing a metal chloride and an emulsifying agent, passing in chlorine gas while maintaining a temperature in the neighborhood of 20–30° C. and then fractionating to obtain a fraction containing the alpha, beta-dichloropropionitrile and another fraction containing the alpha-chloro, beta-hydroxypropionitrile.

5. A method of preparing alpha, beta-dichloropropionitrile and alpha-chloro, beta-hydroxypropionitrile which comprises placing acrylonitrile in an aqueous medium containing a metal chloride and an emulsifying agent, passing in chlorine gas while maintaining a temperature in the neighborhood of 20–30° C., until no more chlorine is taken up and then fractionating to obtain a fraction containing the alpha, beta-dichloropropionitrile and another fraction containing the alpha-chloro, beta-hydroxypropionitrile.

6. As new compositions of matter, compounds of the general formula $X-CH_2-CHCl-CN$, where X is selected from the group consisting of chlorine and hydroxyl.

7. As a new composition of matter, alpha, beta-dichloropropionitrile.

8. As a new composition of matter, alpha-chloro, beta-hydroxypropionitrile.

JAMES D'IANNI.